United States Patent [19]

Cowman

[11] Patent Number: 4,718,468
[45] Date of Patent: Jan. 12, 1988

[54] ROUTER GUIDE

[75] Inventor: George W. Cowman, Monkton, Md.

[73] Assignee: Black & Decker Inc., Newark, Del.

[21] Appl. No.: 833,373

[22] Filed: Feb. 25, 1986

[51] Int. Cl.$^4$ ............................................... B27C 5/10
[52] U.S. Cl. .............................. 144/134 D; 144/136 C
[58] Field of Search ............ 144/134 D, 136 C, 144 S

[56] References Cited

U.S. PATENT DOCUMENTS

| | | |
|---|---|---|
| 1,904,109 | 4/1933 | Wendorf . |
| 2,705,032 | 3/1955 | Pearson .......................... 144/136 C |
| 2,943,655 | 7/1960 | Pedersen et al. . |
| 2,970,618 | 2/1961 | Mitchell ......................... 144/136 C |
| 3,009,494 | 11/1961 | Hinkley . |
| 3,146,675 | 9/1964 | Anderson . |
| 3,363,510 | 1/1968 | Burrows et al. ................. 144/136 C |
| 3,478,788 | 11/1969 | Zelik ................................ 144/136 C |
| 3,635,268 | 1/1972 | Lange . |
| 4,044,805 | 8/1977 | Gronholz . |
| 4,291,735 | 9/1981 | Silken . |
| 4,470,439 | 9/1984 | Sanders . |

FOREIGN PATENT DOCUMENTS 494489  5/1954  Italy ................................ 144/134 D

OTHER PUBLICATIONS

Popular Mechanics, Getting More for Your Router, Mar. 1969, pp. 190–192 and 234, Ray Shoberg.
Rockwell Magic Guide Model 5043–Operating Manual and Parts List, (15 pages).
Sears Craftsman Multipurpose Router Guide, Cat. No. 25179, Owners Manual, (9–80).

Primary Examiner—W. D. Bray
Attorney, Agent, or Firm—J. Bruce Hoofnagle; Dennis A. Dearing; Charles E. Yocum

[57] ABSTRACT

A router guide 26 includes a subbase plate 28 coupled to a guide element 68 by a pair of rods 30 and 32. A pair of guide surfaces 124 and 136 are located on guide element 68 adjacent subbase plate 28 when the guide element is in a first position for use in linear cutting and edge planing operations. A guide bar 182 with trammel point 196 is located adjustably on one surface of guide element 68 for use in a curvilinear cutting operation when the guide element is in a second position which is inverted from the first position. Another pair of guide surfaces 202 and 204 are located on the guide element 68 for use in trimming of internal angle surfaces when the guide element is in a third position which is revolved from the first position.

20 Claims, 13 Drawing Figures

ROUTER GUIDE

BACKGROUND OF THE INVENTION

This invention relates to a router guide and particularly relates to a guide for use with a router during various cutting operations.

Router guides typically include a base plate which secures to the underside of a router. Such guides further include various facilities which are attached to the base plate for guiding the router with reference to surfaces of a workpiece being cut by a bit attached to the router. By using different types of router guides, a router may be guided to trim a variety of surfaces of the workpiece, including straight surfaces, internal angle surfaces and curvilinear surfaces.

Some router guides include facility for guiding a router to form a variety of surfaces, such as linear, internal angle and curvilinear surfaces. However, such router guides typically include a variety of components which are not used in every type of cutting operation of the related router and, therefore, must be set aside or stored when not being used. If a selected type of cutting operation is to be performed such as, for example, an internal angle surface cutting operation, an operator must disassemble any unnecessary components, store the disassembled components and then assemble the necessary components before proceeding with the selected cutting operation. Thus, such router guides require constant disassembly and assembly of components to accomplish the different cutting operations. Also, dismantled components are subject to being misplaced and, thereby, not available when needed.

Therefore, there is a need for a router guide which has facility for retaining all components with the guide during all types of cutting operations even though some of the components are not being used during selected cutting operations.

Other router guides include a trammel point which extends from an adjustable plate to facilitate the guiding of the router to form arcuate slots and circular holes in the workpiece. The adjustable plate is typically mounted on the underside of an arm of the guide with the trammel point extending downwardly in a position spaced from but parallel with the router bit. If a cutting operation is being performed which does not require the use of the trammel point, the operator must use caution to insure that the trammel point does not engage a surface which could undesirably alter the intended direction of movement of the router bit. As an alternative, the operator could remove and store the adjustable plate until the plate and trammel point are needed.

In any event, the operator must devote special consideration to the adjustable plate and trammel point when the plate and trammel point are not being used during certain cutting opera ions.

SUMMARY OF THE INVENTION

This invention contemplates a router guide for guiding a router during cutting operations and includes a base means for attachment to the router. The router guide further includes a guide element which is coupled to the base means. The guide element has located thereon a first means for guiding the router when the guide element is in a first position relative to the base means during a cutting operation other than a curvilinear cutting operation. Also, the guide element has located thereon a second means for guiding the router when the guide element is in a second position relative to the base means during a curvilinear cutting operation.

DETAILED DESCRIPTION OF THE PREFERRED EMBODIMENT

Figures 1, 3:
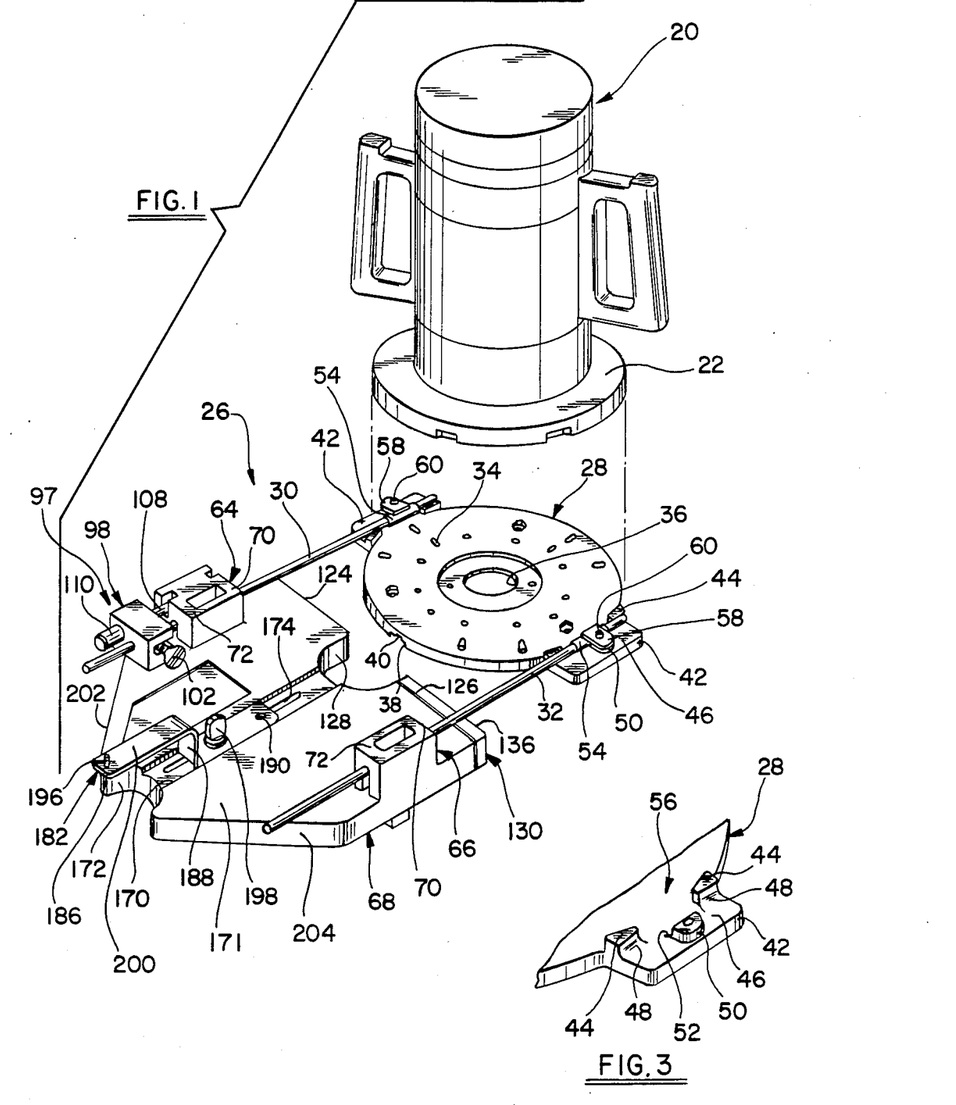
FIG. 1 is a perspective view of a router in position for assembly with a router guide embodying certain principles of the invention.
FIG. 3 is a partial perspective view showing a rod-support post and other features of the subbase plate for supporting the rods with the plate.
Figure 12:
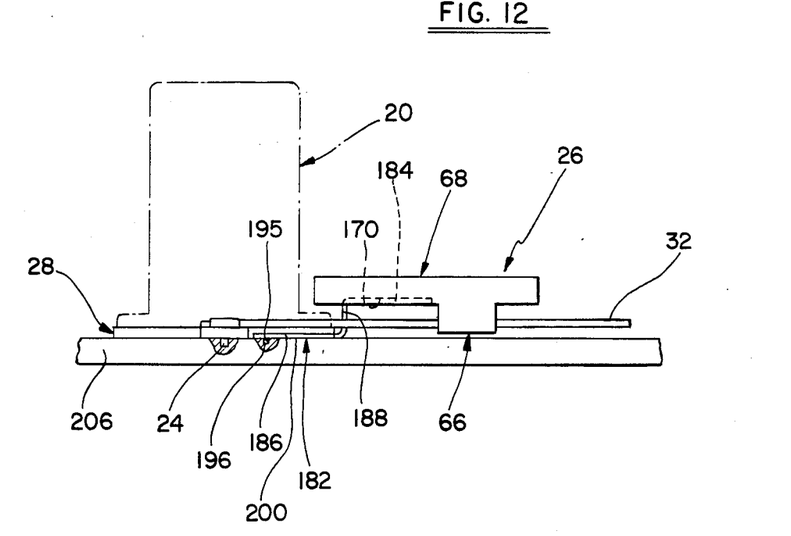
FIG. 12 is a side view of the router guide of FIG. 1 in assembly with the router to guide the router through a circle or arc of relatively small radius in accordance with certain principles of the invention.
Figure 13:
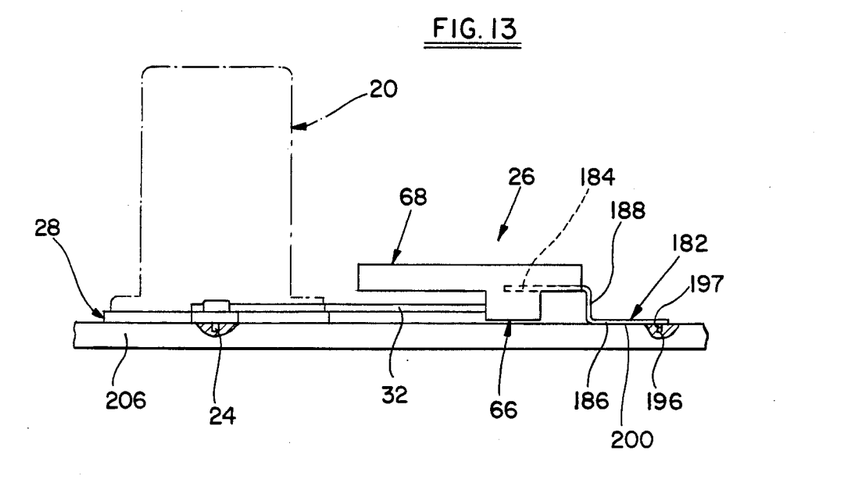
FIG. 13 is a side view of the router guide of FIG. 1 in assembly with the router to guide the router bit through a circle or arc of relatively large radius.

Referring to FIG. 1, there is illustrated a router 20 having a base plate 22 which, as illustrated in FIGS. 12 and 13, supports a router bit 24. A router guide 26 includes a base means such as a subbase plate 28 which is attached to two spaced, parallel rods 30 and 32. Subbase plate 28 is formed with a variety of holes 34 to facilitate attachment to different types of routers 20 and is formed with a central opening 36 for reception of router bit 24.

Figures 2, 8:
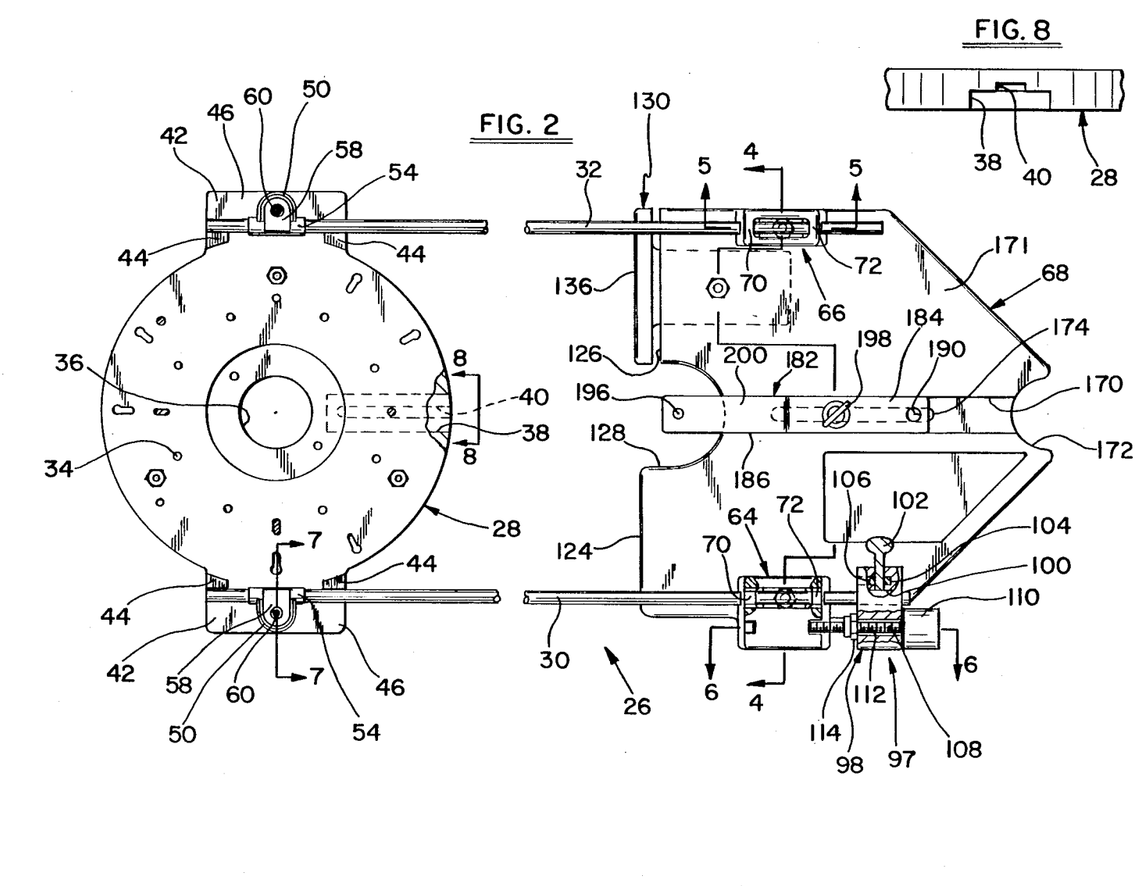
FIG. 2 is a plan view of the router guide of FIG. 1 showing a subbase plate assembled by a pair of rods with a guide element.
FIG. 8 is a view taken along line 8—8 of FIG. 2 showing a slot formed in the underside of the subbase plate for receipt of a curvilinear guide bar.

Referring to FIGS. 1, 2 and 8, the underside of subbase plate 28 is formed with a guideway 38 which extends from an edge of the plate toward the center of the plate. Further, a central groove 40 is formed in guideway 38 and extends from the edge of plate 28 toward the opposite end of the guideway.

Referring to FIGS. 1 and 2, subbase plate 28 is formed with a pair of lateral extensions 42 which extend from opposite sides of the plate. Since the pair of extensions 42 are identical, only one extension will be described. As shown in FIG. 3, a pair of spaced pie-shaped pedestals 44 extend outwardly from one surface 46 of extension 42 and form curved surfaces 48 where outer sidewalls of the pedestals join surface 46. A rod-support post 50 is located adjacent the central outer edge of extension 42 and adjacent the space between pedestals 44. Further, a curved surface 52 is formed where the inner sidewall of post 50 joins surface 46.

Figure 7:
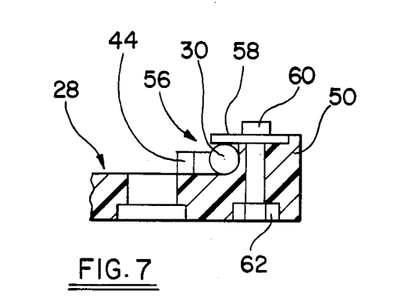
FIG. 7 is a sectional view taken along line 7—7 of FIG. 2 showing the rod-support post of the subbase plate and a clamp for securing a rod with the post.

As shown in FIGS. 1, 2 and 7, each of the rods 30 and 32 is formed near one end with a portion 54 which is seated in a nest 56 (FIGS. 3 and 7) formed by curved surfaces 48 and 52 of pedestals 44 and post 50, respectively, and contiguous portions of surface 46 of extension 42. Clamp plates 58 are positioned over the portions 54 of the rods 30 and 32 and are secured to posts 50 by bolt 60 and nut 62 (FIG. 7). In this manner, rods 30 and 32 are secured to subbase plate 28. It is noted that portions 54 could be formed to enhance the securance of rods 30 and 32 with subbase plate 28. For example, portions 54 could knurled, undercut or formed with a flat.

Figure 4:
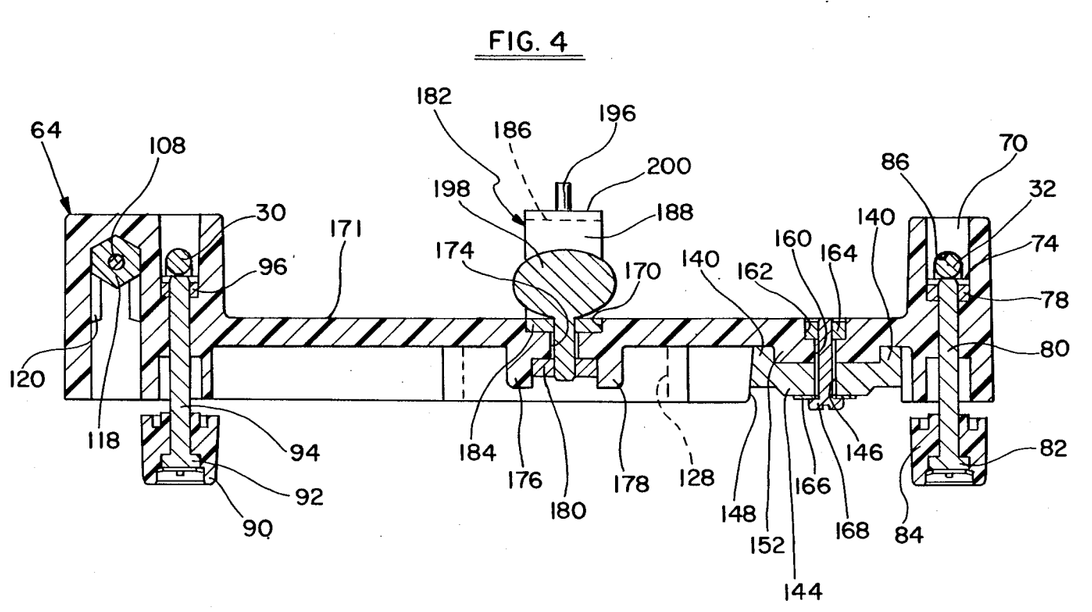
FIG. 4 is a sectional view taken along line 4—4 of FIG. 2 showing various features of the guide element.
Figure 5:
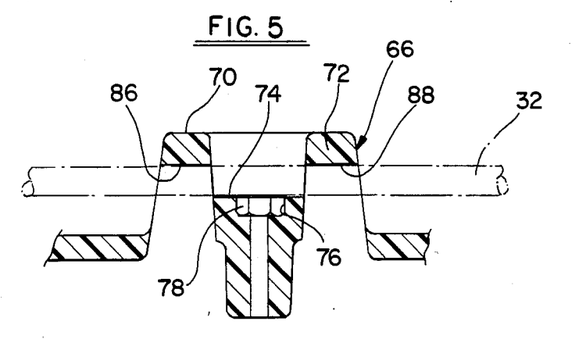
FIG. 5 is a sectional view taken along line 5—5 of FIG. 2 showing a rod-support post of the guide element.

As illustrated in FIGS. 1, 2 and 4, portions of rods 30 and 32 near the other ends thereof are located within rod-supporting posts 64 and 66, respectively, formed integrally with a guide element 6S of router guide 26. As illustrated in FIG. 5, post 66 is formed with two spaced end walls 70 and 72 and an intermediate platform 74. End walls 70 and 72 and platform 74 are arranged to provide a passageway for rod 32 with a portion of the rod resting on platform 74. Further, the surface of platform 74 on which rod 32 rests is formed with a hexagon-shaped pocket 76 for receipt of a nut 78. As shown in FIG. 4, a threaded member 80 is formed with a head 82 at one end thereof and supports a knob 84 on the head. The opposite end of member 80 is threadedly positioned through nut 78 and into engagement with rod 32 to urge portions of the rod against upper surfaces 86 and 88 of the rod passageway formed in end walls 70 and 72, (FIG. 5), respectively.

Therefore, in order to position and secure rod 32 within post 66, knob 84 is rotated to withdraw the threaded end of member 80 within nut 78 to provide a clear passage for the rod through the post. Rod 32 is then moved into the post passageway and rests on platform 74. Thereafter knob 84 is rotated to move the threaded end of member 80 through nut 78 and into engagement with the adjacent portion of rod 32. Eventually, other portions of rod 32 are urged into firm engagement with surfaces 86 and 88 of end walls 70 and 72, respectively, of post 66 to secure the rod with the post.

As viewed in FIGS. 1, 2 and 4, rod 30 is secured with post 64 in the same manner that rod 32 is secured with post 66. As particularly shown in FIG. 4, a knob 90 is mounted on a head 92 of threaded member 94 which is threadedly positioned within a nut 96. By rotational adjustment of knob 90, the threaded end of member 94 urges portions of rod 30 into upper surfaces of end walls of a rod passageway in post 64 to secure the rod with the post.

Thus, rods 30 and 32 and the variously described elements which facilitate the attachment of the rods to subbase plate 28 and guide element 68 form a coupling means for coupling the subbase plate and the guide element wherein the coupling means is formed independently of the subbase plate and guide means.

Referring to FIG. 2, a micro adjuster 97 includes an adjuster support block 98 which is formed with an aperture 100 to facilitate the positioning of the block onto the end of rod 30. A thumb screw 102 is threadedly positioned within a nut 104 which is non-rotatably located within a slot 106 of block 98 and engages rod 30 to secure the block with the rod. A threaded member 108 is formed with a knob 110 at one end thereof. A threaded portion of member 108 is positioned within an unthreaded passageway 112 formed through block 98 and is threadedly located within a lock nut 114 which is located closely adjacent an outside wall of the block. Lock nut 114 is mounted on threaded member 108 and rotates therewith but does not move axially on the threaded member. In this manner, threaded member 108 can be rotated but is precluded from moving axially by virtue of knob 110 and nut 114 being located on opposite sides of the block. An intermediate section of the threaded member 108 extends from nut 114 and is located in an open area between block 98 and post 64 with the remainder of threaded member 108 located within a passageway in the post as viewed in FIG. 6. As further viewed in FIG. 6, a nut 118 is mounted non-rotatably between two rib members 120 and 122 within post 64 and is positioned to receive the portion of threaded member 108 which is located within the post.

Figure 6:
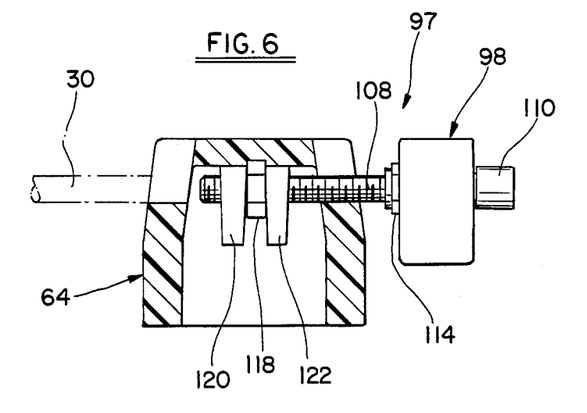
FIG. 6 is a sectional view taken along line 6—6 of FIG. 2 showing a micro adjuster for adjusting the location of the guide element relative to the rods and the subbase plate.

After block 98 has been secured to the end of rod 30, knob 90 is rotated to relax the securance of rod 30 to post 64. Threaded member 108 can then be rotated by turning knob 110. Since block 98 is secured to rod 30, the rotation of threaded member 108 causes post 64 to move relative to the rod and, thereby, causes guide element 68 to move relative to rod 30. Thus, by use of micro adjuster 97, micro adjustment of guide element 68 relative to subbase plate 28 can be attained.

Figure 9:
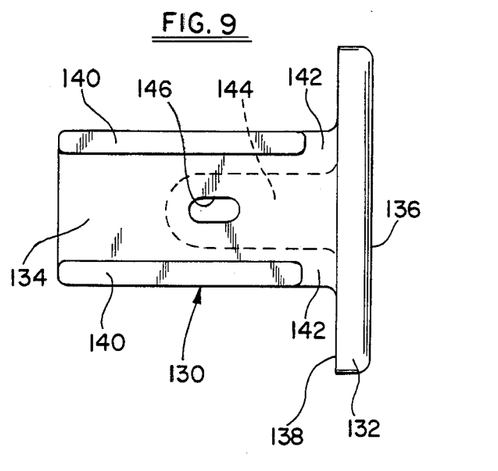
FIG. 9 is a plan view of an adjustable fence which is assembled with the guide element of FIG. 2.

As illustrated in FIG. 2, guide element 68 is formed with a forward guide surface 124 which is offset forwardly of a forward surface 126 and separated therefrom by an arcuate notch 128 formed in the guide element. As shown in FIG. 9, an edge planar fence 130 includes a fence section 132 and an integrally formed slide section 134. Fence section 132 is formed with a front guide surface 136 and a rear face 138. Slide section 134 is integrally formed with rear face 138 of fence section 132 at one end of the slide section and extends away from the fence section to a free end of the slide section. A pair of spaced, parallel rails 140 are formed on one side of slide section 134 and extend from the free end of the slide section to a location spaced from rear face 138 of fence section 132 to form gaps 142 between the ends of the rails and the rear face of the fence section. A central rib 144 is formed on the other side of slide section 134. Also, an elongated slot 146 is formed through fence 130 and extends through rib 144.

Figure 10:
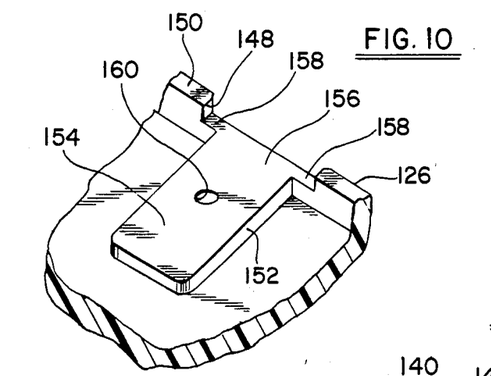
FIG. 10 is a partial perspective view of features of the underside of the guide element of FIG. 2 which cooperate with the adjustable fence of FIG. 9 for limiting movement of the fence.

Referring to FIG. 10, an inverted view of guide element 68 is illustrated to show a slot 148 formed in a lower portion of a wall 150, the outer surface of which forms forward surface 126 (FIG. 2) of the guide element. A pedestal 152 is formed in the underside of guide element 68 and has an outer surface 154 which is planer with a base surface 156 of slot 148. Formation of slot 148 creates short wall sections 158 at opposite ends of the slot. Referring to FIG. 4, an aperture 160 is formed through pedestal 152 to the other side of guide element 68 and communicates with a hexagon-shaped opening 162 which receives a nut 164.

Fence 130 is assembled with guide element 68 by positioning guide rails 140 on opposite sides of pedestal 152 of the guide element and by positioning gaps 142 of the fence over short wall sections 158 of the guide element. In this manner fence section 132 is positioned so that rear face 138 of the fence section is located adjacent to forward surface 126 of guide element 68 and so that slot 146 is aligned with aperture 160. The space dimension of gaps 142, which is formed between the forward ends of rails 140 and face 138 of fence section 132, is slightly greater than the thickness of wall 150 of guide element 68. Therefore, fence 130 can be moved relative to guide element 68 by sliding the fence on outer surface 154 of pedestal 152 over a travel distance equal to the difference between the space dimension of gaps 142 (FIG. 9) and the thickness dimension of wall 150 (FIG. 10). Referring to FIG. 4, a washer 166 is placed on rib 144 and over a portion of slot 146. A headed screw 168 is inserted through washer 166, slot 146, aperture 160 and into threaded engagement with nut 164. In this manner, fence 130 is retained with guide element 68.

In use, fence 130 can be secured with guide element 68 by screw 168 and nut 164 in the position illustrated in FIG. 2 so that the front guide surface 136 of the fence is planar with front guide surface 124 of the guide element. This facilitates use of router guide 26 to guide router 20 in performing a linear routing operation. As illustrated in FIG. 1, fence 130 can be positioned so that front guide face 136 is located inwardly of front guide surface 124 of guide element 68. With fence 130 in this position, router guide 26 guides router 20 during an edge planing operation. It is noted that selected depths of cut for the edge planing operation may be made by locating fence 130 at any of several positions within the travel distance of the fence as noted above.

Front guide surface 124 forms a first guide surface located on guide element 68 and front guide surface 136 of fence 130 forms an adjustable guide surface located on the guide element. Front guide surfaces 124 and 136 thereby form a means for guiding router 20 in the performance of linear routing and edge planing cutting operations when guide element 68 is in one position relative to subbase plate 28 as illustrated in FIGS. 1 and 2.

As viewed in FIGS. 1 and 2, a channel 170 is formed in a top surface 171 of guide element 68 and extends from arcuate notch 128 to another arcuate notch 172 formed on the opposite edge of the guide element. A closed slot 174 is formed in channel 170 and extends through the underside of guide element 68 as viewed in FIG. 4.

Referring further to FIG. 4, the underside of guide element 68 is formed with a pair of spaced walls 176 and 178 which extend between inner walls of notches 128 and 172 to form an enclosure for receipt of a nut 180.

Figure 11:
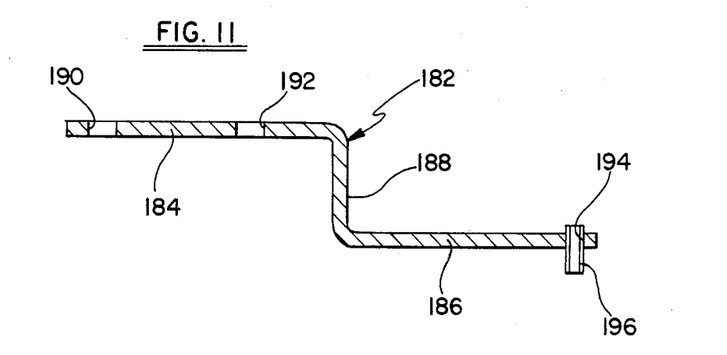
FIG. 11 is a sectional view of the curvilinear guide bar with a trammel point which is adjustably assembled with the guide element of FIG. 2.

As illustrated in FIG. 11, a stepped curvilinear guide bar 182 is formed with a slide leg 184 and a point-support leg 186 integrally joined by a linking leg 188. Legs 184 and 186 are located in spaced parallel planes and are offset from each other and are joined by linking leg 188 to thereby form the bar 182 in a stepped configuration. Slide leg 184 is formed with two through holes 190 and 192. Point-support leg 186 is formed with a through hole 194 and supports a trammel point 196 which is press fit into the through hole and extends outwardly therefrom.

As shown in FIGS. 1 and 2, slide leg 184 of guide bar 182 is positioned in channel 170 for sliding movement therein. A thumbscrew 198 is positioned through hole 192 of slide leg 194 and slot 174 in guide element 68 and is threadedly secured to nut 180 as shown in FIG. 4. By threadedly relaxing thumbscrew 198, guide bar 182 can be slidably moved within channel 170 to facilitate selective positioning of trammel point 196 relative to router bit 24 (FIGS. 12 and 13). Also, thumbscrew 198 can be positioned in through hole 190 of slide leg 184 to facilitate extended positioning of trammel point 196. Further, thumbscrew 198 may be removed from engagement with nut 180 and slide leg 184 to permit repositioning of trammel point 196 through one hundred and eighty degrees. For example, as illustrated in FIG. 1, trammel point 196 extends in the direction of arcuate notch 172 of guide element 68. By removal of thumbscrew 198, guide bar 182 can be removed from channel 170, turned one hundred and eighty degrees and reinserted into the channel so that the trammel point is extending in the direction of arcuate notch 128 of the guide element. Thereafter, thumbscrew 198 can be reassembled with nut 180 to secure the guide bar 182 in the reassembled position Referring to FIGS. 1 and 2, subbase plate 28 is located in a plane slightly above top surface 171 of guide element 68 whereby the plate can be moved partially over the guide element until extensions 42 of the plate engage posts 64 and 66 of the guide element. This permits the locating of router bit 24 (FIGS. 12 and 13) in a variety of positions relative to guide element 68 and as close as necessary to perform linear routing and edge planing operations.

For a linear routing operation, fence 130 is adjusted and secured in an extended position relative to guide element 68, as illustrated in FIG. 2, so that front guide surface 136 of the fence is planar with forward guide surface 124 of guide element 68 thereby to form a first pair of guide surfaces located on the guide element. A selected location of front guide surface 136 and forward guide surface 124 with respect to subbase plate 28, and thereby to router bit 24, then can be obtained by adjustably positioning guide element 68 on rods 30 and 32 as described above. A coarse positioning adjustment is obtained by slidingly and manually locating guide element 68 on the rods 30 and 32 and then using micro adjuster 97 to obtain a finer adjustment of the guide element relative to subbase plate 28 and router bit 24. Forward guide surface 124 and front guide surface 136 can then be placed into engagement with and moved along a straight surface of a workpiece (not shown) to guide the router bit 24 during the linear routing operation.

For edge planing operations, fence 130 can be adjustably positioned relative to guide element 68 to provide for a depth of planing of an edge of the workpiece by router bit 24. Guide element 68 is moved on rods 30 and 32 toward router bit 24 until the bit is located adjacent to arcuate notch 128 of the guide element and in position to provide the selected depth of planing. During the edge planing operation, front guide surface 136 of fence 130 will engage and move along an edge of the workpiece to be edge planed or dressed. In this position, front guide surface 136 will be moving forward of router bit 24 during the planing operation. Forward guide surface 124 of guide element 68 will engage and move along the planed edge of the workpiece in a location which trails router bit 24 during the planing operation.

For trimming of internal surfaces angled at ninety degrees, guide element 68 is withdrawn from rods 30 and 32, turned or revolved one hundred and eighty degrees within the plane of the guide element and is reassembled on the rods with arcuate notch 172 facing subbase plate 28. This locates guide element 68 in another position relative to subbase plate 28 in preparation for another cutting operation, that is, the trimming of internal surfaces. Each of two guide surfaces 202 and 204 of guide element 68 extend from arcuate notch 172 toward posts 64 and 66, respectively, at an angle of forty-five degrees and, if extended in front of the notch, would form an angle of ninety degrees. Guide element 68 is adjustably and selectively located with respect to router bit 24 on rods 30 and 32 in the vacinity of arcuate notch 172. Guide surfaces 202 and 204 are then positioned on edges of the workpiece which form an angle of ninety degrees and router bit 24 is thereby guided to perform an internal angle trimming operation. Therefore, guide surfaces 202 and 204 form a second pair of guide surfaces located on guide element 68 and form another means for guiding router 20 when the guide element is in the revolved position to accomplish another type of cutting operation, that is, the trimming of internal surfaces.

During the linear routing, edge planing and internal angle trimming operations, curvilinear guide bar 182 is positioned so that point-support leg 186 is extending in a direction away from router 20, for example, as illustrated in FIG. 1, in an inoperable position. This insures that curvilinear guide bar 182 does not interfere with the locating of guide element 68 relative to subbase plate 28 in preparation for the above-noted cutting operations. At the same time, curvilinear guide bar 182 is always carried with router guide 26 and is readily available when needed.

When router guide 26 is to be used to guide router 20 in the formation of curvilinear cuts such as, for example, a circular routed cut, curvilinear guide bar 182 is selectively positioned within channel 170 and guide element 68 is then removed from rods 30 and 32, inverted and reassembled onto the rods to locate the guide element in still another position relative to subbase plate 28. This locates guide bar 182 in an operable position. Trammel point 196, which now extends downwardly, is inserted into a hole 195 (FIG. 12) or 197 (FIG. 13) formed in a workpiece 206 each of which is sufficiently deep to receive the trammel point in a tightly fitting arrangement. Holes 195 and 197 form center points in the workpiece 206 wherein the center points are each located by a prescribed distance from an arc or circle to be cut in the workpiece and represents the radius of the arc or circle. Thus, curvilinear guide bar 182, which is located on guide element 68, forms a guide means for guiding router 20 during a curvilinear cutting operation when the guide element is in the inverted position.

As illustrated in FIG. 12, in order to obtain a curvilinear routed cut such as an arc or circular routed cut having a small radius, curvilinear guide bar 182 is adjustably secured in channel 170 so that point-support leg 186 extends from guide element 68 and nests in guideway 38 of subbase plate 28. It is also noted that surface 200 (FIG. 11) of point-support leg 186, from which trammel point 196 extends, is flush with the underside of subbase plate 28. Further, groove 40 provides clearance for any portion of the opposite end of trammel point 196 which may extend from the other side of point-support leg 186. In this manner, trammel point 196 is positioned a considerable distance inwardly of the periphery of base plate 22 of router 20 and close to router bit 24. Thereafter, trammel point 196 is located in hole 195 formed in the workpiece 206 while router bit 24 forms a hollow opening in the workpiece consistent with the size of the bit. Router 20 is then moved in an arc about trammel point 196 to form the curvilinear routed cut with a radius equal to the distance between the trammel point and the router bit 24. As router 20 is moved about trammel point 196 on one side thereof, guide element 68 also is moved about the trammel point on the side of the trammel point which is opposite from the router bit.

Since the trammel point 196 is positioned considerably inwardly of the periphery of base plate 22, the radius of the curvilinear routed cut is less than the radius of the base plate. Also since surface 200 of point-support leg 186 is flush with the underside of subbase plate 28, router 20 is permitted to move unobstructed on the surface of the workpiece 206 in which trammel point 196 is located. Further, linking leg 168 is of sufficient length to insure that point-support leg 186 is located in a plane which is spaced further from surface 171 of guide element 68 than posts 64 and 66 extend outwardly from the surface. In this manner, downwardly turned posts 64 and 66 are located sufficiently above workpiece 206 so that there is no contact between the posts and the workpiece during the curvilinear routing operation.

Referring to FIG. 13, when it is desired to form a curvilinear routed cut having a larger radius, curvilinear guide bar 182 is removed from guide element 68 and mounted in the opposite end of channel 170. In this position, trammel point 196 is located a considerable distance from router bit 24 with guide element 68 located therebetween. Trammel point 196 is positioned in hole 197 formed in workpiece 206. Also, router bit 24 forms a hollow opening in the workpiece consistent with the size of the bit. Router 20 is then moved in an arc about trammel point 196 to form the curvilinear routed cut with a larger radius. Again, downwardly turned posts 64 and 66 are located sufficiently above workpiece 206 so that there is no contact between the posts and the workpiece during the curvilinear routing operation. As an alternative to removing guide bar 182, guide element 68 can be removed from rods 30 and 32, revolved in the plane of the guide element by one hundred and eighty degrees and then reassembled on the rods.

As described above, guide element 68 is adjustable with respect to router 20, router bit 24 and subbase plate 28. Further, curvilinear guide bar 182 is adjustable within channel 170 and is formed with two throughholes 190 and 192 which permit the secured locating of the guide bar in a variety of positions within the channel by virtue of slot 174, thumbscrew 198 and nut 180. These combined facilities of adjustment of guide element 68 and curvilinear guide bar 182 permit a wide range of selective locations of trammel point 196 between the position illustrated in FIG. 12 to the position illustrated in FIG. 13. In the preferred embodiment, router guide 26 provides for the forming of curvilinear routed cuts having diameters selected from a range of two and one-half inches to two feet. Other router guides embodying the inventive facilities of router guide 26 could provide a selection of diameters beyond the range of the preferred embodiment without departing from the spirit and scope of the invention.

Thus, in the preferred embodiment, router guide 26 includes a wide faced edge guide formed by forward guide surface 124 and front guide surface 136 which provides added stability during the guiding of router 20 in a cutting operation. Further, micro adjuster 97 provides facility for extremely accurate locating of router bit 24 to obtain desired cutting of a workpiece. Also, the manner of mounting fence 130 on guide element 68 provides for an easy and quick adjustment of the fence to prepare for edge planing operations of selective depths. Still further, the manner of mounting curvilinear guide bar 182 on guide element 68 permits the guide bar to be carried with the guide element during linear and internal angle cutting operations without interfering with such operations.

This manner of mounting further permits quick adjustment of curvilinear guide bar 182 for use in a curvilinear cutting operation and, by use of micro adjuster 97, can be adjusted quickly for accurate positioning of trammel point 196 relative to router bit 24.

Subbase plate 28, guide element 68, adjuster block 98 and fence 130 are formed from a lightweight durable plastic such as, for example, polystyrene. All other components of the router guide 26 are formed from metal. However, other materials could be used for the different components of router guide 26 without departing from the spirit and scope of the invention.

Subbase plate 28, guide element 68 and rods 30 and 32 are assembled with each other to form router guide 26 independently of any assembly with router 20. Thus, if desired, guide element 68 can be adjusted relative to subbase plate 28 as described above to accurately locate the guide element with respect to the subbase plate prior to any assembly of the subbase plate with base 22 of router 20. This facility provides the operator with the opportunity to locate guide element 68, as well as fence 130 and curvilinear guide bar 182, in the selected position while handling only the lightweight router guide 26 and not while supporting and manipulating router 20 at the same time.

Having described one embodiment of the invention, which embodiment represents the best mode presently known, it will be apparent that numerous modifications, variations and alternate forms of the invention will become obvious to those skilled in the art. Therefore, it is to be understood that the foregoing description is intended to be purely illustrative of the invention, and that the legal scope of the invention shall not be limited otherwise than as expressly set forth in the following claims.

What is claimed is:

1. A router guide for guiding a router having a router bit which engages a portion of a workpiece during cutting operations, which comprises:
    base means for attachment to a base plate of the router;
    a guide element;
    coupling means for coupling the base means and the guide element;
    first means located on the guide element for guiding the router when the guide element is in a first position relative to the base means during a cutting operation other than a curvilinear cutting operation; and
    second means located on the guide element at a location spaced from the portion of the workpiece engaged by the router bit for guiding the router when the guide element is in a second position relative to the base means during a curvilinear cutting operation.

2. A router guide for guiding a router during cutting operations, which comprises:
    base means for attachment to a base plate of the router;
    a guide element;
    coupling means formed independently of the base means and the guide element for coupling the base means and the guide element;
    the guide element being mountable on the coupling means in a first position and movable relative to the coupling means to be mountable in a second position thereon; and
    means secured to the guide element in an inoperable position when the guide element is in the first position and in an operable position when the guide element is in the second position for guiding the router during a curvilinear cutting operation.

3. A router guide for guiding a router during cutting operations, which comprises:
    base means for attachment to a base plate of the router;
    a guide element;
    coupling means for coupling the base means and the guide element;
    means located on the guide element for guiding the router when the guide element is in a first position relative to the base means during a first prescribed cutting operation;
    means located on the guide element for guiding the router when the guide element is in a second position relative to the base means during a second prescribed cutting operation; and
    guide means, supportable on the guide element when the guide element is in the first position and second position, for guiding the router during a curvilinear cutting operation when the guide element is in a third position relative to the base means.

4. A router guide for guiding a router during cutting operations, which comprises:
    base means for attachment to a base plate of the router;
    a guide element;
    couplig means for coupling the guide element to the base means and in either of at least two positions relative to the base means; and
    curvilinear guiding means mountable on the guide element for guiding the router during a curvilinear cutting operation while the guide element is located in one of the two positions.

5. The router guide as set forth in claim 4, wherein the base means includes:
    a subbase plate;
    means for attaching the subbase plate to a base of the router; and
    means for attaching the plate to the coupling means.

6. The router guide as set forth in claim 4, which further comprises:
    means for adjustably locating the guide element on the coupling means relative to the base means independently of any attachment of the base means to the router.

7. The router guide as set forth in claim 4 wherein the coupling means includes a pair of rods with one end of each rod attachable to the base means and a portion near the opposite end of each rod attachable to the guide element.

8. The router guide as set forth in claim 4 wherein the curvilinear guiding means includes:
    a stepped guide bar formed by a first leg and second leg integrally joined by a linking leg to form a stepped configuration;
    a trammel point attached to a free end of the first leg; and means formed in the second leg for facilitating the securance of the second leg to the guide element.

9. A router guide for guiding a router during cutting operations, which comprises:
   a subbase plate for attachment to the router;
   a guide element;
   coupling means for coupling the subbase plate and the guide element;
   the guide element positionable on the coupling means in at least first and second positions relative to the subbase plate;
   a pair of guide surfaces located on the guide element for guiding the router relative to a workpiece when the guide element is in the first position and during a prescribed cutting operation;
   guide means mounted on the guide element for guiding the router during a curvilinear cutting operation when the guide element is in the second position.

10. The router guide as set forth in claim 9 which further comprises:
    the guide element positionable on the coupling means in a third position; and
    a second pair of guide surfaces located on the guide element for guiding the router relative to a workpiece when the guide element is in the third position and during a different prescribed cutting operation.

11. The router guide as set forth in claim 9, which further comprises:
    at least one of the pair of surfaces located on the guide element being adjustable relative to the guide element and the subbase plate for adjusting alignment of the pair of surfaces relative to each other to guide the router in a different prescribed cutting operation.

12. The router guide as set forth in claim 9, which further comprises:
    the subbase plate being formed with a pair of spaced nests for receipt of portions of the coupling means; and
    means for securing the portions of the coupling means within the nests.

13. The router guide as set forth in claim 9, which further comprises:
    a pair of spaced posts formed on one surface of the guide element for receipt and support of portions of the coupling means; and
    means for securing the portions of the coupling means within the nests.

14. The router guide as set forth in claim 9, which further comprises:
    means mounted on the coupling means and attached to the guide element for adjusting the location of the guide element relative to the subbase plate.

15. The router guide as set forth in claim 9, wherein the guide means includes:
    a stepped guide bar formed with:
    a first leg;
    a second leg; and
    a linking leg integrally joining ends of the first and second legs in a stepped configuration;
    a trammel point attached to a free end of the first leg; and
    means formed in the second leg for facilitating the securance of the second leg to the guide element.

16. The router guide as set forth in claim 15, which further comprises:
    a channel formed in one surface of the guide element for receipt of the second leg of the stepped guide bar; and
    means for securing the second leg of the stepped guide bar within the channel so that the first leg of the stepped guide bar is parallel with the one surface of the guide element and the trammel point extends away from the one surface.

17. The router guide as set forth in claim 16 wherein the first leg is spaced sufficiently from the one surface of the guide element to preclude any portions of the guide element from engaging any portions of a workpiece during the curvilinear cutting operation.

18. The router guide as set forth in claim 15 wherein the subbase plate is formed with a guideway for receipt of the first leg with the trammel point extending away from the subbase plate during a prescribed curvilinear cutting operation.

19. A router guide for guiding a router during cutting operations, which comprises:
    a subbase plate for attachment to the router;
    a guide element;
    coupling means for coupling the subbase plate and guide element;
    the guide element being locatable on the coupling means relative to the subbase plate (a) in a first position, (b) in a second position which is inverted from the first position and, (c) in a third position which is revolved from the first position;
    a first pair of guide surfaces located on the guide element for guiding the router in a first prescribed non-curvilinear cutting operation when the guide element is in the first position;
    a guide means located on the guide element for guiding the router in a curvilinear cutting operation when the guide element is in the second position; and
    a second pair of guide surfaces located on the guide element for guiding the router in a second prescribed non-curvilinear cutting operation when the guide element is in the third position.

20. The router guide as set forth in claim 19 which further comprises:
    means for adjusting one guide surface relative to the other guide surface of the first pair of guide surfaces to guide the router in a third prescribed non-curvilinear cutting operation when the guide element is in the first position.

* * * * *